(12) United States Patent
Faught (10) Patent No.: US 7,802,566 B1
(45) Date of Patent: Sep. 28, 2010

(54) PORTABLE BARBECUE SET AND KIT

(76) Inventor: Robert Faught, P.O. Box 7037, Bunkerville, NV (US) 89007

( * ) Notice: Subject to any disclaimer, the term of this patent is extended or adjusted under 35 U.S.C. 154(b) by 1220 days.

(21) Appl. No.: 11/389,688

(22) Filed: Mar. 27, 2006

(51) Int. Cl.
*A47J 37/10* (2006.01)
*A47J 37/00* (2006.01)

(52) U.S. Cl. .................... 126/30; 126/9 R; 126/9 B; 126/38; 173/91; 248/156; 248/545

(58) Field of Classification Search ............... 126/30, 126/9 R, 9 B, 38; 135/118; 173/91, 126; 52/98, 155, 158; 144/195.5, 193.1; 30/172, 30/277, 164.6; 248/545, 156; 81/463; 40/607.06
See application file for complete search history.

(56) References Cited

U.S. PATENT DOCUMENTS

| | | | | |
|---|---|---|---|---|
| 32,643 A | * | 6/1861 | Parr | 206/541 |
| 244,898 A | * | 7/1881 | Hoskins | 206/541 |
| 499,128 A | * | 6/1893 | Loewenthal | 126/38 |
| 509,222 A | | 11/1893 | Higbie | |
| 1,423,612 A | * | 7/1922 | Jewett | 211/85.31 |
| 1,452,640 A | * | 4/1923 | Hulick | 248/121 |
| 1,458,679 A | * | 6/1923 | Bishop | 126/261 |
| 1,521,265 A | * | 12/1924 | Anderson | 29/275 |
| 1,643,433 A | * | 9/1927 | Walker | 81/463 |
| 1,666,293 A | | 4/1928 | Lorton | |
| 1,743,505 A | * | 1/1930 | Turgeon | 173/93.7 |
| 2,098,146 A | * | 11/1937 | Hunt | 173/126 |
| 2,173,024 A | | 9/1939 | Park | |
| 2,827,846 A | * | 3/1958 | Karkling | 99/339 |
| 2,923,335 A | * | 2/1960 | Joyce | 81/441 |
| 2,960,979 A | | 11/1960 | Stone | |
| 2,974,662 A | | 3/1961 | Forrest | |
| 3,050,095 A | * | 8/1962 | Prather | 144/195.5 |
| 3,094,113 A | * | 6/1963 | Avila | 126/30 |
| 3,162,113 A | * | 12/1964 | Tallaksen | 99/446 |
| 3,344,780 A | | 10/1967 | Anderson | |
| 3,395,692 A | | 8/1968 | Johns | |
| 3,511,222 A | | 5/1970 | Miller | |
| 3,519,234 A | * | 7/1970 | Matson | 248/156 |
| 3,792,739 A | * | 2/1974 | Deike | 173/118 |

(Continued)

*Primary Examiner*—Carl D Price
(74) *Attorney, Agent, or Firm*—Gabor L. Szekeres (57) ABSTRACT

A barbecue kit includes a threaded rod having a bore in its interior along its longitudinal axis. An elongated stake having a sharp and a blunt end loosely fits into the interior bore of the threaded rod. The combination of rod and stake include a functional mechanism for allowing the threaded rod to act as a slide hammer to drive the stake into the ground without allowing the rod to fall along the entire length of the stake. A grill having a handle includes a plate with a substantially circular cut-out. The distance and configuration of the cut-out and handle are dimensioned in such a way that the grill can be hung at any place on the threaded rod with the circular cut-out engaging the threads. A pan suitable for holding items to be cooked, or charcoal, or like fuel suitable for cooking, has a like handle which is nevertheless removable and reversibly mountable on the pan. The pan can be similarly hung on the rod either with its hollow or with its substantially flat side up on the threaded rod. When hung on the threaded rod both the grill and the pan can be lowered or raised on the rod by turning it on the threads of the rod.

19 Claims, 6 Drawing Sheets

U.S. PATENT DOCUMENTS

| | | | |
|---|---|---|---|
| 4,230,089 A | 10/1980 | Barden | |
| 4,280,540 A * | 7/1981 | Meacham | 144/195.5 |
| 4,363,313 A | 12/1982 | Smith | |
| 4,577,667 A * | 3/1986 | Gray et al. | 144/195.5 |
| 4,607,608 A | 8/1986 | Allred et al. | |
| 4,896,651 A | 1/1990 | Kott, Jr. | |
| 4,979,490 A * | 12/1990 | Nudo et al. | 126/30 |
| 4,979,940 A | 12/1990 | Bobo et al. | |
| 5,355,867 A | 10/1994 | Hall et al. | |
| 5,666,940 A | 9/1997 | Kreiter | |
| 5,862,742 A | 1/1999 | Bjerg | |
| 6,029,646 A * | 2/2000 | Jackson | 126/30 |
| 6,575,417 B1 * | 6/2003 | Krommenakker | 248/311.2 |
| 6,640,797 B1 * | 11/2003 | Magers | 126/30 |
| 6,827,077 B1 | 12/2004 | Haas | |
| 2004/0129855 A1 | 7/2004 | Chen | |
| 2004/0144379 A1 * | 7/2004 | Lewis | 126/30 |

\* cited by examiner

PORTABLE BARBECUE SET AND KIT

BACKGROUND OF THE INVENTION

1. Field of the Invention

The present invention is in the field of portable barbecue sets. More particularly, the present invention is in the field of a barbecue set which is readily useable at virtually any site where its base can be driven into the ground, and the set can be used as a grill, pan or griddle.

2. Brief Description of Background Art

Basic barbecue sets and barbecuing equipment have been known and in use for a long time. Nevertheless, the task of barbecuing can present challenges in many ways, for example in terms of ease of use and versatility of the equipment, use with various fuels, use in remote locations, use in locations where open fires or fires burning on the ground are prohibited, and also in terms of compactness and transportability of the equipment. For this reason, the prior art patent literature includes several patents directed to barbecue sets or equipment having improved features in terms of capability to be used at remote locations, and ease and convenience of use. The following United States patents are known to the present inventor to be of interest as background to the present invention: U.S. Pat. Nos. 6,029,646; 2,827,846; 5,666,940; 4,979,940; 3,511,22; 5,355,867; 5,862,742; 4,896,651; 4,607,608; 6,827,077; 509,222; 1,666,293; 2,173,024; 2,960,979; 2,974,662; 3,344,780; 3,395,692; 4,363,313; and published U.S. Patent Application Nos. US 2004/0129855 A1 and US 2004/0144379 A1.

However, further improvements in terms of relative simplicity of construction, ease of use, versatility and better portability are still desired in this art. Moreover, in relatively recent times there are more and more outdoor locations, such as county, state and national parks, national forests and other outdoor locations which have relatively high fire risk and where the use of open fires or use of burning charcoal placed on the ground are prohibited. The portable barbecue set and kit of the present invention overcomes several disadvantages or deficiencies of the prior art, is of relatively simple construction, easy to use, versatile for allowing cooking on a grill, in a pan or on a griddle, and can be used in locations where fires or charcoal placed on the ground are prohibited.

OBJECTS AND SUMMARY OF THE INVENTION

It is an object of the present invention to provide a barbecue set and kit which can be used virtually anywhere where a stake can be driven into the ground.

It is another object of the present invention to provide a barbecue set and kit which meets the foregoing objective and where driving the stake into the ground is virtually effortless and is highly unlikely to present risk of injury to the person driving the stake into the ground.

It is still another object of the present invention to provide a barbecue set and kit which meets the foregoing objectives and which can be used as a grill, griddle or pan for cooking.

It is yet another object of the present invention to provide a barbecue set and kit which meets the foregoing objectives and which can be used with a fire or hot charcoals placed on the ground or in a specially designed pan for that purpose.

It is a further object of the present invention to provide a barbecue set and kit which meets the foregoing objectives and which allows relatively easy disposal of embers or ashes after the cooking had been finished and allows easy removal of the set from the ground.

It is still a further object of the present invention to provide a barbecue set and kit which meets the foregoing objectives and which is readily made into a compact self-contained relatively flat package that is easy to carry.

These and other objects and advantages are attained by a barbecue set and kit including a threaded rod having a bore in its interior along its longitudinal axis. An elongated stake having a sharp and a blunt end loosely fits into the interior bore of the threaded rod. The combination of rod and stake include a functional mechanism for allowing the threaded rod to act as a slide-hammer to drive the stake into the ground without allowing the rod to fall along the entire length of the stake. A grill having a handle includes a plate with a substantially circular cut-out. The distance and configuration of the cut-out and handle are dimensioned in such a way that the grill can be hung at any place on the threaded rod with the circular cut-out engaging the threads. When the grill is hung it stays in position on the threaded rod but it can be lowered or raised on the rod by turning it on the threads of the rod.

A pan suitable for holding items to be cooked, or charcoal, or like fuel suitable for cooking, has a like handle which is nevertheless removable and reversibly mountable on the pan. The pan can be similarly hung on the rod either with its hollow or with its substantially flat side up on the threaded rod and can also be moved on the rod, up or down, by turning motion. When the charcoal or other fuel is placed on the ground instead into the pan then the pan can be used with its hollow side up as a vessel for cooking or with its substantially flat side up as a griddle for cooking.

DETAILED DESCRIPTION OF THE INVENTION

The following specification, taken in conjunction with the drawings, sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
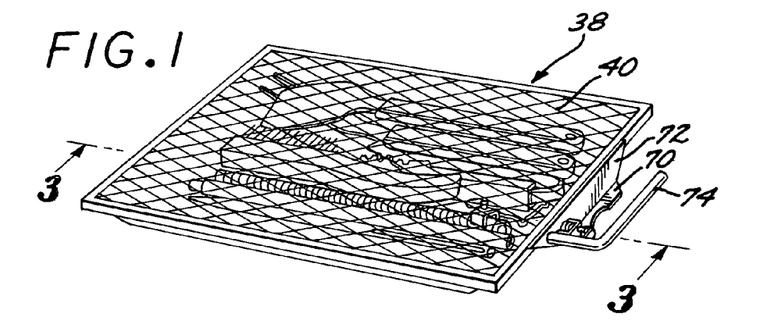
FIG. 1 is a perspective view of the barbecue set of the present invention assembled as a kit.
Figure 2:
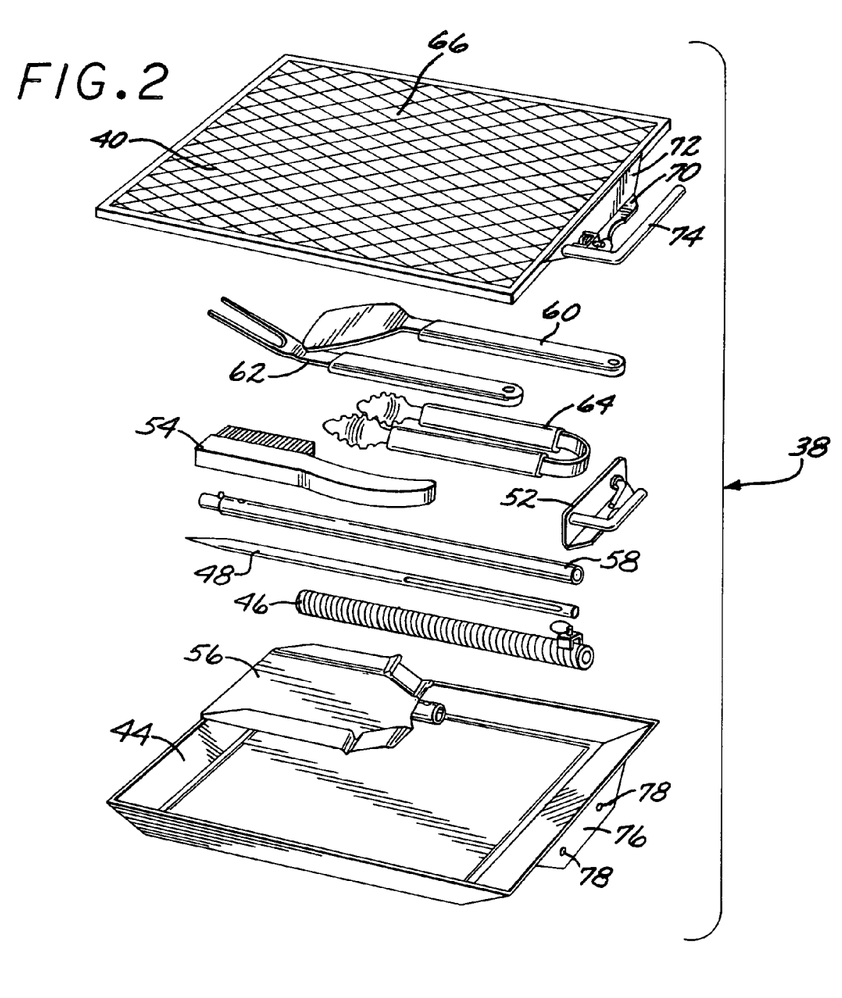
FIG. 2 is an exploded perspective view of the kit shown in FIG. 1.

Referring now to the drawing figures, and particularly to the perspective and exploded perspective views of FIG. 1 and FIG. 2 the entire barbecue set, assembled as a kit 38, of the present invention is disclosed. The barbecue set and kit 38 includes a grill 40 of the type on which meat, such as steaks, hamburgers or meat chops (not shown) are usually cooked over charcoal (not shown) or open fire 42 (shown in later figures), and a pan 44 into which either charcoal or other fuel, or food-to-be-cooked (not shown) can be placed. The barbecue set and kit 38 also includes a threaded rod 46, a stake to be 48 to driven into the ground 50 (shown in later figures), and a handle 52 which is removably attachable to the pan 44. For the convenience of the user (not shown) the barbecue set and kit 38 also includes such conventional items which are normally used in outdoor barbecuing and picnic activities, namely a wire brush 54, a shovel 56 having a removable handle 58, a spatula 60, a fork 62, and a pair of thongs 64. Because the wire brush 54, the shovel 56, the spatula 60, the fork 62, and the pair of thongs 64 are conventional no claim of inventiveness per se is made regarding these items except as included in the combination barbecue kit 38 of the present invention.

Figure 3:
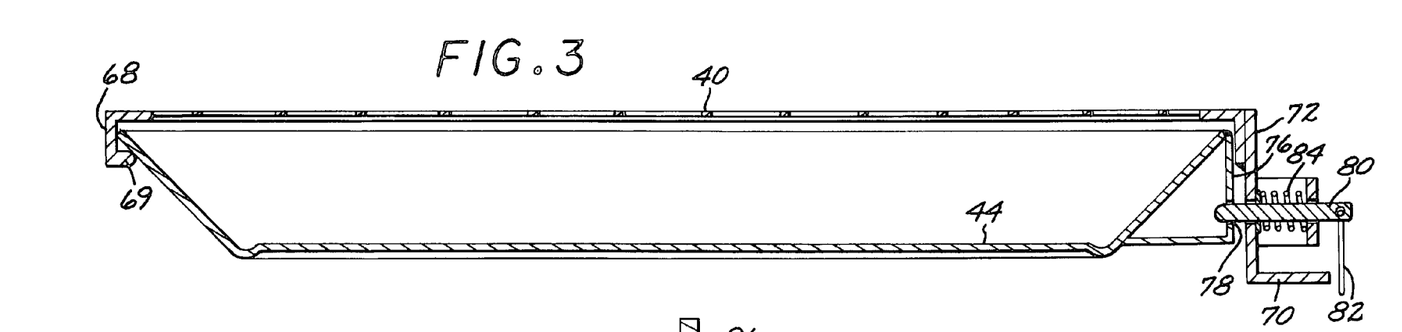
FIG. 3 is a cross-sectional view taken on lines 3,3 of FIG. 1.

Referring now primarily to FIG. 3, the grill 40 assembled to the pan 44 in the position in which the kit 38 would be carried is shown. For the sake of ease of illustration FIG. 3 does not show the conventional items and some other parts of the present invention contained in the carrying assembly of the grill 40 and the pan 44. Both the grill 40 and the pan 44 are made from materials conventionally used for this purpose. In the presently described preferred embodiment the pan 44 is made of 16 gauge steel, although it should be understood that, unless described otherwise, neither the dimensions nor the materials of the several parts of the barbecue set 38 are critical in nature and can be subject to such changes and substitutions which will become readily apparent to those skilled in the art in light of the present disclosure.

The grill 40 includes the conventional latticed surface 66 on which meat (not shown) or other foods (not shown) are conventionally barbecued over hot coals (not shown) or open fire 42. At one extremity the grill 40 has a downwardly protruding plate 68 having an ear 70 that allows mounting of the grill 40 to the pan 44. At the other extremity the grill 40 includes another downwardly protruding plate 72 to which another ear 70 and a handle 74 (shown in FIGS. 1 and 2) are fixedly mounted. Referring still primarily to FIG. 3 the pan 44 at one of its extremity also includes downwardly protruding plate 76 which includes two apertures 78 although only one aperture is visible in FIG. 3. The handle 74 of the grill 40 includes a spring-mounted pin 80, equipped with a ring 82, which under bias of the spring 84 engages one of the apertures 78 and thereby removably mounts the grill 40 to the pan 44. The dimensions, configuration and role of the handle 74 to removably affix the grill 40 on the threaded rod 46 is described further below in this specification.

Figure 4:
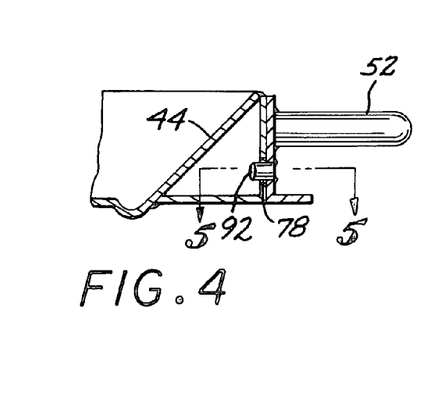
FIG. 4 is a partial view showing placement of a removable handle to a pan included in the barbecue set.
Figure 5:
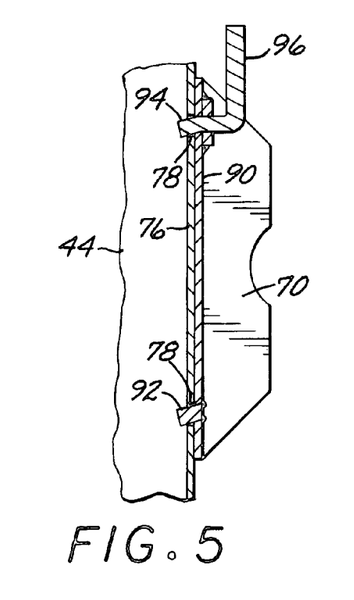
FIG. 5 is a cross-sectional view taken on lines 5,5 of FIG. 4.
Figure 6:
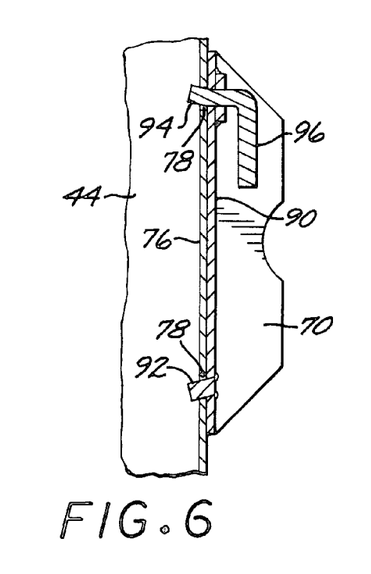
FIG. 6 is a cross sectional view similar to FIG. 5, showing attachment of the removable handle to the pan.
Figure 7:
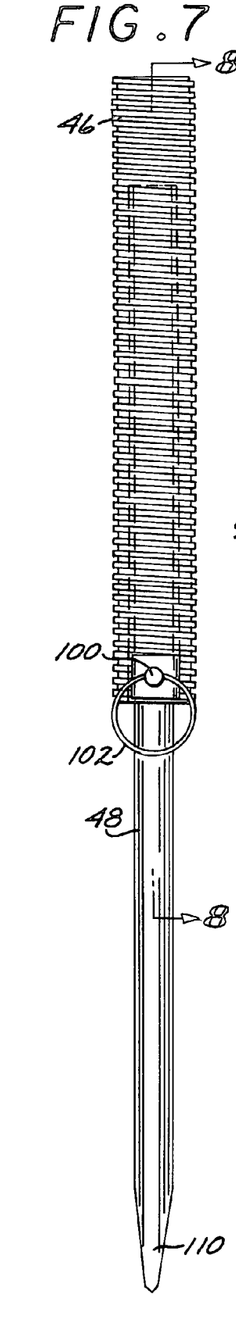
FIG. 7 is a plan view of a threaded rod and stake included in the barbecue set of the present invention.
Figures 8, 9, 10:
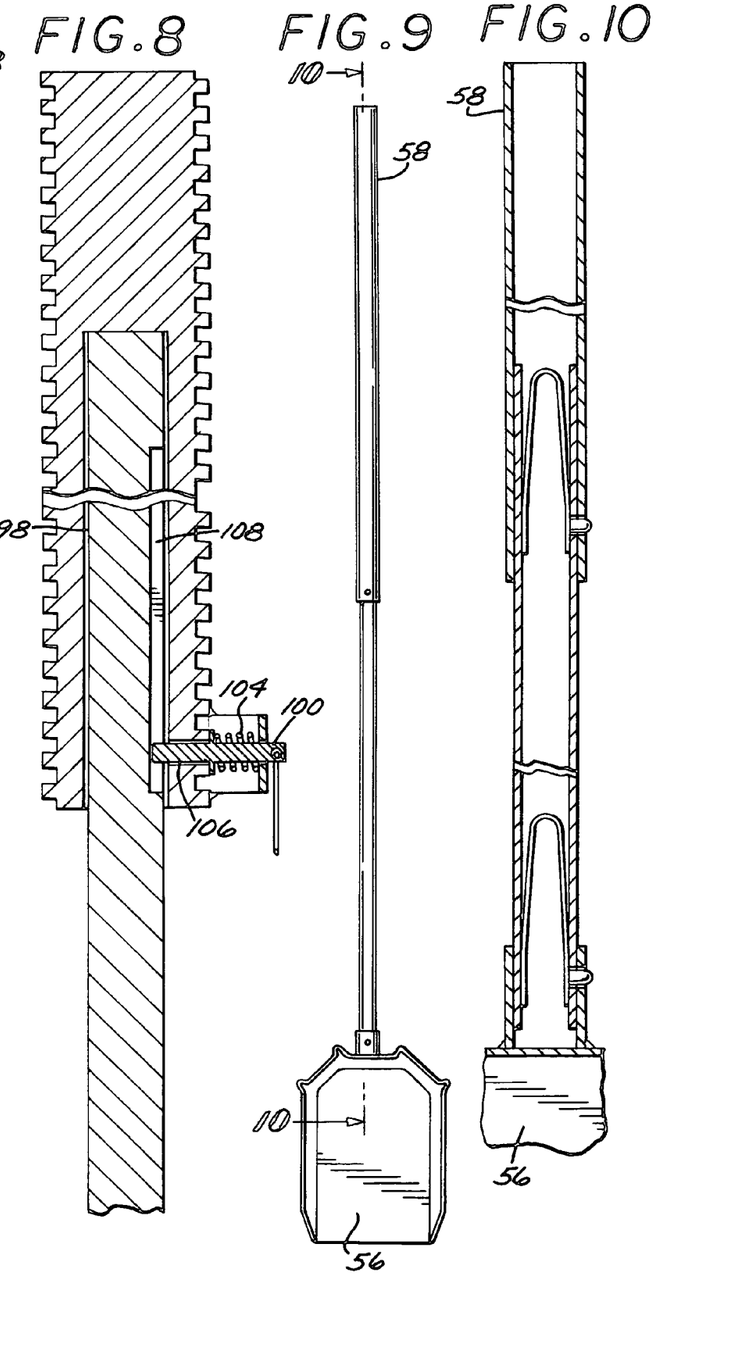
FIG. 8 is a cross-sectional view taken on lines 8,8 of FIG. 7.
FIG. 9 is a plan view of a shovel having a removable handle, included in the barbecue set of the present invention.
FIG. 10 is a cross-sectional view taken on lines 10,10 of FIG. 9.

Referring now primarily to FIGS. 4, 5 and 6 mounting of the handle 52 to the pan 44 is described. It should be noted at the outset that the handle 52 is normally mounted on the pan 44 only for use of the pan 44 while cooking or barbecuing. For carrying the handle 52 is normally contained in the assembled kit 38, as shown in FIGS. 1 and 2. It should also be understood that the handle 52 is "reversible" on the pan 44, meaning that it is mountable on the pan 44 in the position of the pan 44 in which the pan is used with its hollow side 86 up (best shown in FIGS. 16 and 18), or in the position in which the pan 44 is used with its substantially flat side 88 facing up (best shown in FIGS. 17 and 19). Thus, the handle 52 includes a plate 90, a pin 92 mounted fixedly in an angle relative to the plate 90 and a second pin 94 that includes an elbow 96 and a portion that protrudes in the same direction as the first pin 92 and also at a angle relative to the plate 90. However the second pin 94 is rotatable relative to the plate 90. The two pins 92 and 94 are spaced in such a manner that they can be inserted into the two apertures 78 of the pan 44. FIG. 5 shows the two pins 92 and 94 in the position where they are inserted but the handle 52 is not yet affixed to the pan 44. FIG. 6 shows the position of the second pin 94 after it has been manually turned by a user (not shown). In this position, shown in FIG. 6, the handle 52 is affixed, although removably, to the pan 44. The dimensions, configuration and role of the handle 52 to removably affix the pan 44 on the threaded rod 46 is also described further below in this specification.

Referring now primarily to FIGS. 7, 8, 11 and 12, the treaded rod 46, the stake 48 and their role in setting up the barbecue set 38 for barbecuing or cooking are described. The threaded rod 46 is presently made of steel and has an outside diameter of approximately 1⅜ to 1¼ inches, although the diameter range is not limiting. Nevertheless a diameter range of approximately ¾ to 2 inches is preferred. The threaded rod 46 has an internal bore 98 making it open at one end and closed at the other end. The stake 48, which is preferably also made of steel, loosely fits within the internal bore 98 like a piston in a cylinder. A spring loaded pin 100, having a ring 102 to enable pulling of the pin 100 against the bias of the spring 104 is affixed to the outside surface of the threaded rod 46. An aperture 106 is provided in the threaded rod 46 to enable the pin 100 to penetrate into the interior of the threaded rod 46. The stake 48 includes a groove or slot 108 in its side. The slot 108 has blind ends and the pin 100 engages the slot 108 when the stake 48 is inserted within the internal bore 98 of the threaded rod 46. The lower end 110 of the stake 48 is pointed or made otherwise sharp to enable its easy penetration into the ground 50.

Figure 11:
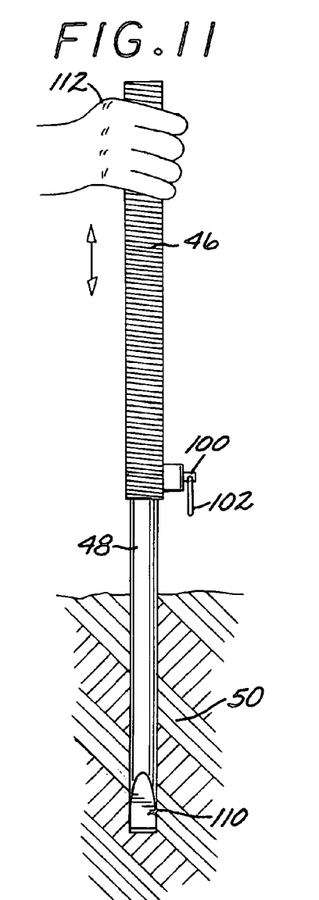
FIG. 11 is a plan view schematically showing how the stake of the barbecue set is driven into the ground while using the threaded rod as a slide-hammer.

As it will be already readily apparent from the present description and inspection of the drawing figures, particularly of FIG. 11, one function of the threaded rod 46 is to act as slide hammer to make it relatively easy and convenient to drive the stake 48 into the ground 50. For this and other reasons and purposes the presently preferred embodiment of the threaded rod 46 is approximately 13 inches long, and the preferred embodiment of the stake 48 is 15 inches long. In the presently preferred embodiment the slot 108 in the stake 48 is approximately one half of the length of the threaded rod 46. The stake 48 is preferably made of steel, although other metals, such as strong aluminum, bronze and still others can also be used. Because the threaded rod 46 is used as a slide hammer preferably it is relatively heavy. For this and other reasons, such as cost, the threaded rod 46 is also preferably made of steel, and its present weight is approximately 3.25 lbs. However, other metals, especially bronze could also be used for the threaded rod 46.

Figures 21, 22:
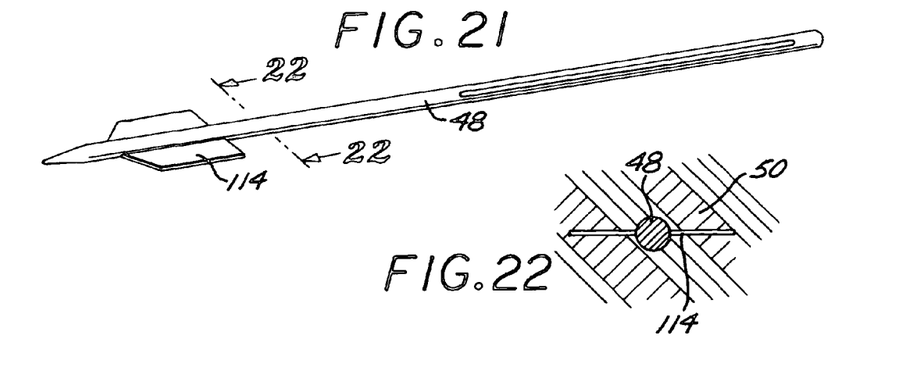
FIG. 21 is a perspective view of an alternative embodiment of the stake included in the barbecue set and kit of the present invention.
FIG. 22 is a cross-sectional view taken on lines 22,22 of FIG. 21, the view showing the alternative embodiment of the stake in a position to be driven into the ground.

Referring now primarily to FIG. 11 it can be readily seen that a user whose hand 112 is shown will alternatively lift and drop the threaded rod 46 to drive the stake 48 into the ground 50. Because the spring-biased pin 100 engages the slot 108 of the stake 48 it is unlikely that by lifting the rod 46 for the pounding motion will also lift it off entirely from the stake 46. For the same reason it is also unlikely that by dropping the rod 46 in the pounding motion the user will damage his or her hands. Moreover, the engagement of the pin 100 with the slot 108 also prevents the threaded rod 46 from turning relative to the stake 48. FIG. 21 shows an alternative embodiment of the stake 48 having wings 114 which can be driven into the ground 50 and prevent the turning of the stake 48 relative to the ground 50. The engagement of the pin 100 with the slot 108 also enables the user to relatively easily pull the stake 48 out of the ground 50 when after use it is desired to disassemble the barbecue set 38 for storage or transportation.

In general terms the dimensions, including weight and materials of the threaded rod 46 and of the stake 48 should be such which enable the above-described functions, and also preferably enable these parts to be included in the assembled kit 38 suitable for compact storage and transportation. Still speaking generally, the length of the threaded rod 46 is contemplated to be within the range of 8 to 15 inches, the depth of the internal bore 98 is contemplated to be 5 to 10 inches. In the presently preferred embodiment the internal bore 98 is approximately 6 inches long.

Figure 12:
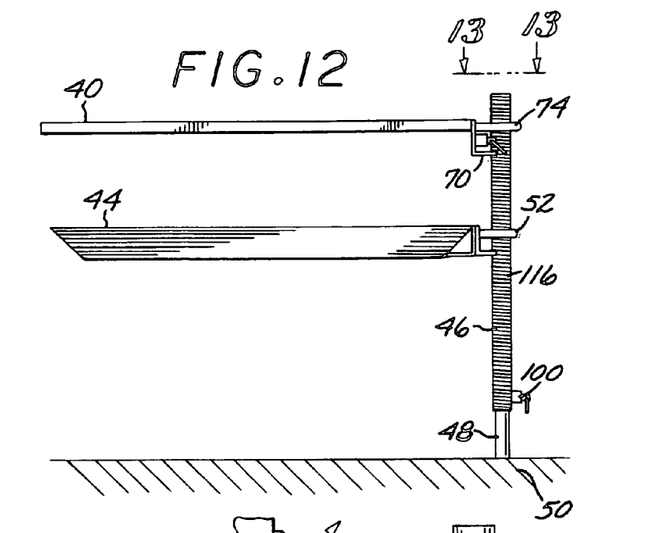
FIG. 12 is a plan side view showing the assembled barbecue set.
Figure 13:
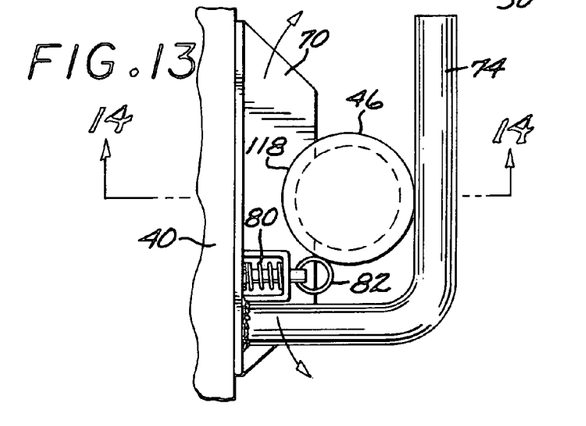
FIG. 13 is a partial top view taken on lines 13,13 of FIG. 12.
Figure 14:
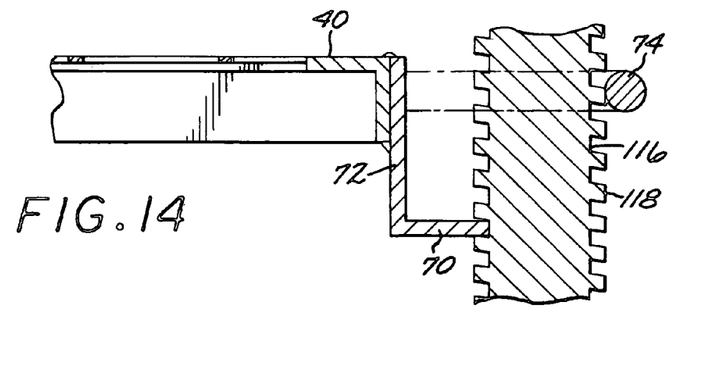
FIG. 14 is a cross-sectional view taken on lines 14,14 of FIG. 13.

Referring now primarily to FIGS. 12, 13 and 14, the mounting of the grill 40 and of the pan 44, or of both, to the threaded rod 46 is described. In this regard it should be noted at the outset that the mounting of both the grill 40 and of the pan 44 is based on substantially the same principles and functions with the exception that the handle 52 of the pan 44 is removable and reversible in its position relative to the pan 44. The enlarged views of FIGS. 13 and 14 depict the mounting of the grill 40 to the threaded rod 46. Threads 116 of the rod 46 serve the functions of holding the mounted grill 40 or pan 44 at virtually any length of the rod 46 and to allow up and down movement of the grill 40, of the pan 44, or of both, on the rod 46 by angling either of these items relative to the rod 46 or by turning them on the rod 46. Presently the rod 46 has 4 threads 116 per inch of its length, but more widely or more densely spaced threads, such as 3 or 5 threads per inch, would equally serve the purpose.

As is shown in FIG. 13, the ear 70 of the grill 40 has a substantially quadri-circular or semi-circular cut-out portion 118 which preferably corresponds in diameter to the diameter of the threaded rod 46 minus the depth of the threads 116. The combination of the L-shaped handle 74 and the ear 70 with its cut-out portion 118 is dimensioned in such a manner that when the grill 40 is placed on the threaded rod 46 in a substantially horizontal position then the handle 74 and the ear 70 engage opposite sides of the rod 46. Consequently the grill 40 sits stably, although removably, on the rod 46. To accomplish the foregoing, in the preferred embodiment the distance between the handle 74 and the edge of the cut-out portion 118 is the diameter of the rod 46 minus the depth of the threads 116. In alternative less preferred embodiments the cut-out portion 118 of the ear 70 can be made smaller or omitted, in which case the distance between the handle 74 and the edge of the ear 70 is the diameter of the rod 46 minus the depth of the threads 116. Proper dimensioning of the space between the ear 70, with or without the cut-out portion 118, and the handle 74 relative to the diameter of the threaded rod 46 is important to enable the removable placement of the grill 40 (and of the pan 44) on the threaded rod 46.

The spring biased pin 80 visible in FIG. 13 is the pin which in the assembled kit (shown in FIG. 1) locks the grill 40 to the pan 44.

Referring now primarily to FIGS. 12, and 15 through 19 use of the assembled barbecue set 38 of the present invention is illustrated and described. FIG. 12 illustrates the use wherein the grill 40 is mounted on top and the pan 44 is mounted below. Typically, in this situation coals (not shown) are contained in the pan 44 and food, typically meat (not shown), to be barbecued is placed on the grill 40. The relative distance of the grill 40 to the pan 44 can be initially adjusted by moving either or both of these items in an angled position relative to the rod 46 and thereafter allowing them to become horizontal and fixed. While moving the items at an angle the ear 70 of the grill 40 and the like ear of the handle 52 of the pan 44 clear the threads 116 of the rod 46. After these items become hot, they can be moved up or down by turning them on the rod 46, as is shown schematically by a circle with arrows 120 in FIG. 20.

Figure 15:
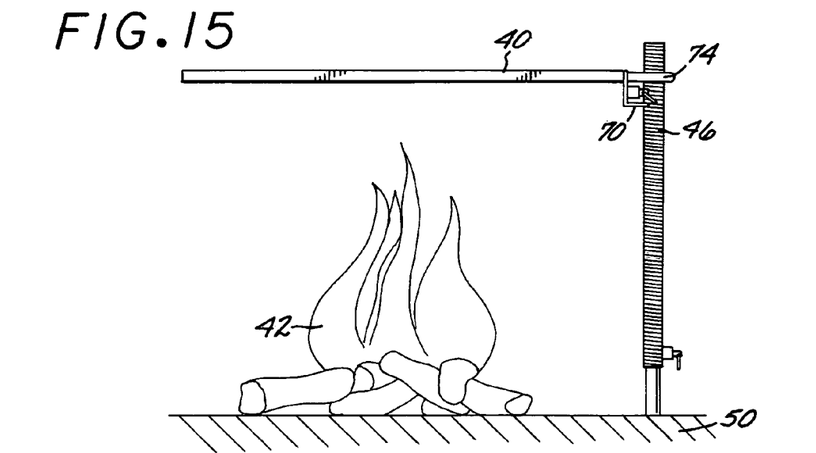
FIG. 15 is a plan side view showing the barbecue set assembled with only the grill on the threaded rod.
Figure 16:
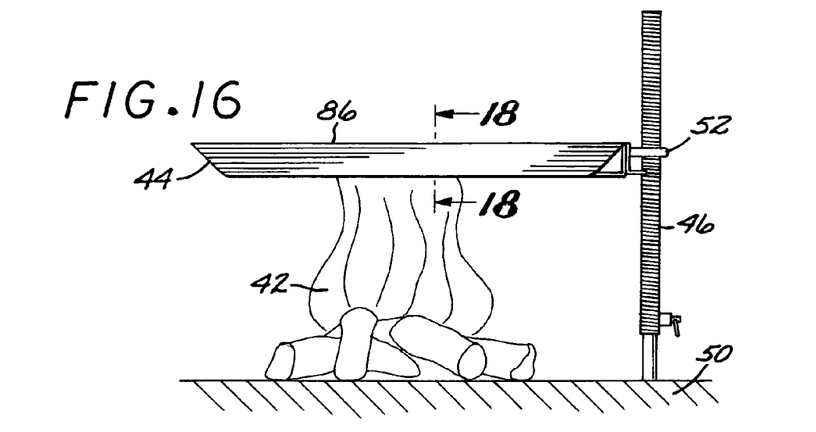
FIG. 16 is a plan side view showing the barbecue set assembled with only the pan to be used for cooking in its hollow side.
Figure 17:
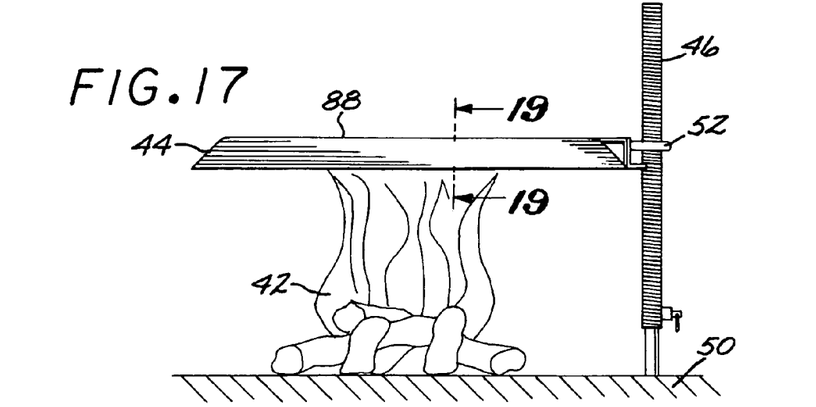
FIG. 17 is a plan side view showing the barbecue set assembled with only the pan, with the substantially flat side of the pan facing upward, to be used for cooking as a griddle.
Figure 18:
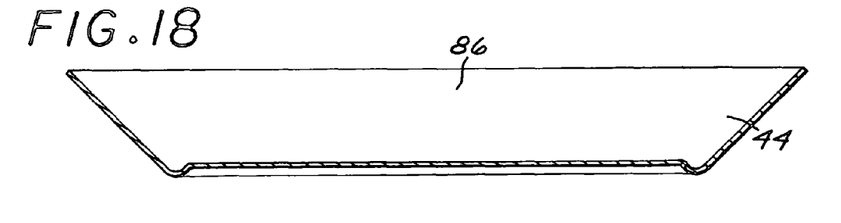
FIG. 18 is a plan side view of the pan with its hollow side facing upward.
Figure 19:
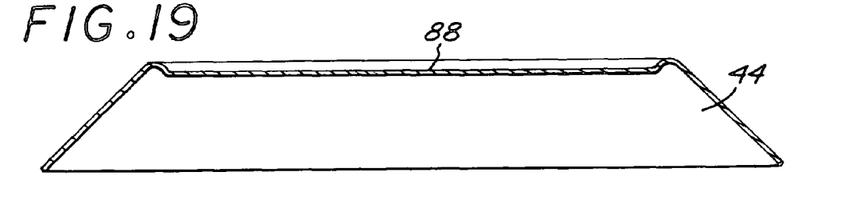
FIG. 19 is a plan side view of the pan with its substantially flat side facing upward.
Figure 20:
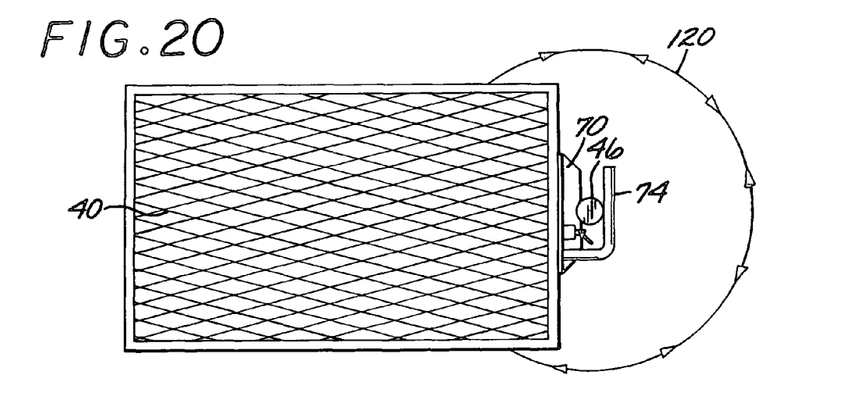
FIG. 20 is a plan top view showing the grill mounted on the threaded rod, the circle with the arrows showing that the grill can be raised or lowered by turning it on the threaded rod.

FIG. 15 illustrates the use of the barbecue set in a situation where the hot fuel (coals or open fire 42) is on the ground 50 and only the grill 40 is mounted to the rod 46. FIG. 16 illustrates the use of the barbecue set in a situation where the hot fuel (coals or open fire 42) is on the ground 50 and only the pan 44 with its hollow side 86 facing up is mounted to the rod 46. Such use of the barbecue set is likely to occur when food (not shown) is desired to be cooked inside the pan 44, similarly to cooking food in a pot (not shown). FIG. 17 illustrates the use of the barbecue set in a situation where the hot fuel (coals or open fire 42) is on the ground 50 and only the pan 44 with its substantially flat side 88 facing up is mounted to the rod 46. Such use of the barbecue set is likely to occur when food such as eggs or bacon or the like (not shown) is desired to be cooked on the top of the pan 44, similarly to cooking such food on a griddle (not shown). FIG. 18 shows the pan 44 with its hollow side 86 up, and FIG. 19 shows the pan 44 with its flat side 88 up. Both of these figures show that edges of the flat side 88 are slightly elevated so as to prevent run off of juices or fat and improve the use of the pan 44 as a griddle.

What has been described above is a barbecue set and kit that is compact, easy to store and transport, and can be used in a very versatile manner even in places where open fires or placement of hot coals on the ground are prohibited and for the task of traditional barbecuing, or other types of cooking in an outdoor location.

Several modifications of the present invention may become readily apparent to those skilled in the art in light of the foregoing disclosure. Therefore, the scope of the present invention should be interpreted solely from the following claims, as such claims are read in light of the disclosure.

What is claimed is:
1. An outdoor barbecue set comprising:
   a grill mountable to the ground and adapted for cooking food items on the grill;

a pan having a substantially hollow side adapted for holding food or solid fuel used for cooking, and a substantially flat side useable as a griddle;

a threaded rod having a longitudinal axis and including an internal bore along said longitudinal axis;

a stake having a width dimensioned to fit within the internal bore of the threaded rod;

first means included in the threaded rod and the stake for allowing the threaded rod to move up and down the stake while removably locking the stake in the rod to prevent complete removal of the rod from the stake whereby the rod can be utilized as a slide hammer to drive the stake into the ground;

second means included in the grill for substantially horizontally mounting the grill on the threaded rod while the second means engage one thread of the rod whereby the grill can be moved up and down on the rod by rotating the grill on the rod, and third means included in the pan for substantially horizontally mounting the pan on the threaded rod while the third means engage one thread of the rod whereby the pan can be moved up and down on the rod by rotating the pan on the rod.

2. An outdoor barbecue set in accordance with claim 1 where the first means comprise the stake having a longitudinal slot with two blind ends, the threaded rod including a transverse aperture and a spring-biased pin affixed to the threaded rod in the aperture whereby the spring-biased pin penetrates into the internal bore of the rod to engage the slot.

3. An outdoor barbecue set in accordance with claim 1 where the second means comprise a plate affixed to one extremity of the grill and a handle attached to the grill and having a portion spaced from the grill, the plate and the spaced portion being dimensioned to be placed on the threaded rod, said rod having a side, with the plate engaging one thread of the rod and the handle engaging the side of the rod.

4. An outdoor barbecue set in accordance with claim 3 further including a second-spring biased pin, said grill having an extremity and said second-spring biased pin being attached to said extremity and a first aperture in the extremity of the pan, the second pin fitting the aperture in the extremity of the pan whereby the grill can be locked to the pan for storage or transportation with the second pin being placed into the aperture in the extremity of the pan.

5. An outdoor barbecue set in accordance with claim 4 where the extremity of the pan includes a second aperture, the first and second apertures are spaced from one another and wherein the plate of the removable handle further includes two pins spaced from one another and dimensioned to be placed into the spaced apertures and functioning as means for removable attaching the plate of the handle to the pan.

6. An outdoor barbecue set in accordance with claim 1 where the third means comprise a removable handle removably attached to one extremity of the pan, the handle including a plate and a portion spaced from the plate, the plate and the spaced portion being dimensioned to be placed on the threaded rod with the plate engaging one thread of the rod said rod having a side and the spaced portion engaging the side of the rod.

7. An outdoor barbecue set in accordance with claim 6 where the removable handle is removably attachable to the pan in two positions, in the first position the pan being mountable with its hollow side up on the threaded rod, in the second position the pan being mountable with its substantially flat side up on the threaded rod.

8. An outdoor barbecue set in accordance with claim 1 where the threaded rod and the stake are dimensioned to fit in the hollow side of the pan thereby enabling their storage in the pan.

9. An outdoor barbecue set, mountable to the ground, comprising:

a threaded rod having a longitudinal axis and a set diameter and further including an internal bore along its said longitudinal axis, the threaded rod having threads of a set depth;

a stake having a width dimensioned to fit within the internal bore of the threaded rod, the stake having a longitudinal slot with two blind ends, the threaded rod including a transverse aperture and a spring-biased pin affixed to the threaded rod whereby the spring-biased pin penetrates into the internal bore of the rod to engage the slot whereby the stake is removably locked in the rod to prevent complete removal of the rod from the stake whereby the rod can be utilized as a slide hammer to drive the stake into the ground;

a grill adapted for cooking food items on the grill, the grill having a plate affixed to one extremity of the grill and a handle attached to the grill and having a portion spaced from the plate, the plate and the spaced portion being dimensioned to be placed on the threaded rod with the plate engaging one thread of the rod and the handle engaging the side of the rod whereby the grill is substantially horizontally mounted on the threaded rod and whereby the grill can be moved up and down on the rod by rotating the grill on the rod, a pan having a substantially hollows side adapted for holding food or solid fuel used for cooking, and a substantially flat side useable as a griddle, and a removable handle removably attached to one extremity of the pan, the handle including a plate and a portion spaced from the plate, the plate and the spaced portion being dimensioned to be placed on the threaded rod with the plate engaging one thread of the rod and the spaced portion engaging the side of the rod whereby the pan is substantially horizontally mounted on the rod and whereby the pan can be moved up and down on the rod by rotating the pan on the rod.

10. An outdoor barbecue set in accordance with claim 9 further including a second-spring biased pin attached to the extremity of the grill and a first aperture in the extremity of the pan, the second pin fitting the aperture in the extremity of the pan whereby the grill can be locked to the pan for storage or transportation with the second pin being placed into the aperture in the extremity of the pan.

11. An outdoor barbecue set in accordance with claim 10 where the extremity of the pan includes a second aperture, the first and second apertures spaced from one another and wherein the plate of the removable handle further includes two pins fittable into the spaced apertures and functioning as means for removable attaching the plate of the handle to the pan.

12. An outdoor barbecue set in accordance with claim 11 where the removable handle is removably attachable to the pan in two positions, in the first position the pan being mountable with its hollow side up on the threaded rod, in the second position the pan being mountable with its substantially flat side up on the threaded rod.

13. An outdoor barbecue set in accordance with claim 12 where the removable handle, threaded rod and the stake are dimensioned to fit in the hollow side of the pan thereby enabling their storage in the pan.

14. An outdoor barbecue set in accordance with claim 9 where the plate of the grill includes a cut-out portion, the cut out being dimensioned to fit into a thread of the threaded rod.

15. An outdoor barbecue set in accordance with claim 14 where the plate of the grill with its cut-out portion and the handle of the grill are separated by a distance defined by the diameter of the threaded rod minus the depth of the threads.

16. An outdoor barbecue set in accordance with claim 9 wherein the plate of the removable handle includes a cut-out portion, the cut out being dimensioned to fit into a thread of the threaded rod.

17. An outdoor barbecue set in accordance with claim 16 where the plate of the removable handle with its cut-out portion and the portion of the handle spaced from the plate are separated by a distance defined by the diameter of the threaded rod minus the depth of the threads.

18. A compact outdoor barbecue kit mountable to the ground, comprising:
- a threaded rod having a longitudinal axis and including an internal bore along said longitudinal axis;
- a stake having a width dimensioned to fit within the internal bore of the threaded rod, the stake having a longitudinal slot with two blind ends, the threaded rod including a transverse aperture and a spring-biased pin affixed to the threaded rod whereby the spring-biased pin penetrates into the internal bore of the rod to engage the slot whereby the stake is removably locked in the rod to prevent complete removal of the rod from the stake whereby the rod can be utilized as a slide hammer to drive the stake into the ground;
- a grill adapted for cooking food items on the grill, the grill having a plate affixed to one extremity of the grill and a handle attached to the grill and having a portion spaced from the grill, the plate and the spaced portion being dimensioned to be placed on the threaded rod with the plate engaging one thread of the rod and the handle engaging the side of the rod whereby the grill is substantially horizontally mounted the on the threaded rod and whereby the grill can be moved up and down on the rod by rotating the grill on the rod,
- a pan having a substantially hollow side adapted for holding food or solid fuel used for cooking, and a substantially flat side useable as a griddle;
- a removable handle removably attached to one extremity of the pan, the handle including a plate and a portion spaced from the plate, the plate and the spaced portion being dimensioned to be placed on the threaded rod with the plate engaging one thread of the rod and the spaced portion engaging the side of the rod whereby the pan is substantially horizontally mounted on the rod and whereby the pan can be moved up and down on the rod by rotating the pan on the rod;
- a second-spring biased pin attached to the extremity of the grill and a first aperture in the extremity of the pan, the second pin fitting the aperture in the extremity of the pan whereby the grill can be locked to the pan to form a storage space with the second pin being placed into the aperture in the extremity of the pan, and
- the removable handle, threaded rod and the stake being dimensioned to fit in the hollow side of the pan thereby enabling their storage in the storage space.

19. A compact outdoor barbecue kit in accordance with claim 18 further comprising a shovel, a wire brush, a spatula, a fork and a pair of thongs, the shovel, wire brush, spatula, fork and pair of thongs dimensioned to fit in the hollow side of the pan thereby enabling their storage in the storage space.

\* \* \* \* \*